United States Patent
Motoyoshi et al.

(10) Patent No.: US 6,314,189 B1
(45) Date of Patent: Nov. 6, 2001

(54) METHOD AND APPARATUS FOR QUANTUM COMMUNICATION

(76) Inventors: Akio Motoyoshi, 1272-2, 3-chome Ikeda, Kumamoto-shi, Kumamoto-ken 860-0082 (JP); Masahiro Matsuoka, 8-26-502, 5-chome Kurohami, Kumamoto-shi, Kumamoto-ken 860-0862 (JP); Koichi Yamaguchi, 5-37, 1-chome Shimizu Mangoku, Kumamoto-shi, Kumamoto-ken 860-0868 (JP); Tetsuya Ogura, 6-21, 6-chome Kurokami, Kumamoto-shi, Kumamoto-ken 860-0862 (JP); Tetsuya Yoneda, 4-10, Shimizu Kameicho, Kumamoto-shi, Kumamoto-ken 860-0866 (JP)

( * ) Notice: Subject to any disclaimer, the term of this patent is extended or adjusted under 35 U.S.C. 154(b) by 0 days.

(21) Appl. No.: 09/082,050

(22) Filed: May 20, 1998

(30) Foreign Application Priority Data

Oct. 2, 1997 (JP) ................................................ 9-269418
Mar. 30, 1998 (JP) ................................................ 10-83203

(51) Int. Cl.[7] ...................................................... H04L 9/08
(52) U.S. Cl. .............................. 380/278; 380/59; 713/150
(58) Field of Search ........................ 380/278, 59; 713/150

(56) References Cited

U.S. PATENT DOCUMENTS 5,515,438 * 5/1996 Bennett et al. ............................ 380/21
5,675,648 * 10/1997 Townsend .............................. 380/21
5,764,765 * 6/1998 Phoenix et al. ........................ 380/21
5,953,421 * 9/1999 Townsend .............................. 380/21
5,966,224 * 10/1999 Hughes et al. ........................ 359/112
6,028,935 * 2/2000 Rarity et al. ............................ 380/21

OTHER PUBLICATIONS

Bennett, "Quantum Cryptography Using Any Two Nonorthogonal States", Physical Review Letters, vol. 83, No. 21, 1992.*

Bennett et al, "Experimental Quantum Cryptography", J. Cryptology, 5:3–28, 1992.*

Ekert, "Quantum Cryptography Based on Bell's Theorem", Physical Review Letters, vol. 67, No. 6, 1991.*

* cited by examiner

Primary Examiner—Gail Hayes
Assistant Examiner—Jeffrey S. Leaning
(74) Attorney, Agent, or Firm—Adams & Wilks (57) ABSTRACT

A quantum state or qubit is transmitted from a sender to receiver using a quantum teleportation. For this purpose, first, second and third photons are successively produced from a laser source. The first photon is modified in polarization according to encoded information to be sent. The second and third photons are mutually quantum-mechanically correlated and shared by the sender and receiver, respectively. The sender measures the polarized states of the coincidentally appearing first and second photons and transmits measurement outcomes to the receiver via classical communication. The receiver recovers information of the first photon from the third photon based on his measurement and the measurement outcomes transmitted by the sender.

9 Claims, 6 Drawing Sheets

| MEASUREMENT FOR POLARIZED STATES OF PHOTONS[1]&[2] (COINCIDENCE COUNTING) | MEASUREMENT OUTCOMES | COUNTING PROBABILITIES |
|---|---|---|
| $\phi_x B_x$ | $+_1 +_2$ | $\|a+b\|^2$ |
| $\phi_x B_y$ | $+_1 -_2$ | $\|a+b\|^2$ |
| $\phi_y B_x$ | $-_1 +_2$ | $\|a-b\|^2$ |
| $\phi_y B_y$ | $-_1 -_2$ | $\|a-b\|^2$ |

↕92 ⇔ +1
↕95 ⇔ 0
↕98 ⇔ 0
↕93 ⇔ -1

↑ CLASSICAL COMMUNICATION

| MEASUREMENT TERMINALS | MEASUREMENT OUTCOMES |
|---|---|
| $b_x$ | $+_3$ |
| $b_y$ | $-_3$ |
| $b_x$ | $+_3$ |
| $b_y$ | $-_3$ |

↕111 ⇔ $\|\phi\rangle_3$
↕112 ⇔ $\|\phi\rangle_3$
↕113 ⇔ $\|\phi\rangle_3$
↕114 ⇔ $\|\phi\rangle_3$

METHOD AND APPARATUS FOR QUANTUM COMMUNICATION

BACKGROUND OF THE INVENTION

1. Field of the Invention

The present invention relates to a method and an apparatus for a quantum communication, and more particularly to a method and an apparatus adapted for use in transmitting a quantum mechanical state or qubit from a sender to a receiver.

2. Description of the Prior Art

Present information processing concerns transmissions conveying classical Boolean states 0 and 1 (bits), in which security of the communication becomes of greatest importance with the development of the network of communication. Therefore, cryptography schemes with a security against undetected eavesdroppers have been proposed.

In contrast to this, recent quantum information processing involves quantum states (qubits; practically, the polarized states of a photon). Quantum information theory concerns the transmission of quantum states from a sender to a receiver. The classical Boolean states 0 and 1 can be represented (encoding) by a pair of different states of a qubit. The qubit can exist in an arbitrary complex linear combination (superposition) of classical Boolean states. In quantum information processing, these arbitrary unknown states can be transmitted by quantum teleportation, which guarantees near-perfect security of the communication.

The original scheme of the teleportation was proposed by C. H. Bennett et al. (Physical Review Letters, vol.70 (1993), 1895). According to Bennett, in this scheme, the sender and receiver must prearrange the sharing of an EPR-correlated pair of particles. Sender (Alice) makes a joint measurement on her EPR particle and the unknown quantum system (encoded qubit), and sends to Receiver (Bob) the classical results of four measurement outcomes with equal probabilities via a classical message line. Knowing this, Bob can convert the state of his EPR particle into an exact replica of the unknown state which Alice destroyed. Bob can get the transmitted information through the decoding of this replica.

This is a process that disembodies the exact quantum state of a particle [1] into classical data and Einstein-Podolsky-Rosen (EPR) correlations (an entangled state of particles [2] and [3]), and uses these ingredients to reincarnate the state in another particle [3] which has never been anywhere near the first particle. This disembodiment of the exact quantum state of the particle [1] evades eavesdropping. A quantum teleportation scheme of the type proposed by Bennett et al. is of great interest for quantum communication free from any eavesdropping.

From the measurement theoretical point of view, however, their intact scheme of teleportation would be difficult for its realization, since this original teleportation scheme of an unknown state is based on the existence of non-local long range correlations between the EPR pair of particles relevant to the notion of wave function collapse which is nothing but the almost direct paraphrase of the von Neumann projection postulate. This projection postulate necessarily leads to the EPR paradox. As a result of this paradox, the epistemological discussion on the nature of physical reality cannot be avoided. Such philosophical arguments concerning the conceptual aspects of the EPR problem are beyond the realm of physics. Furthermore, if one follows the von Neumann projection postulate, it is difficult to understand the negative-results measurement and the results of some of the neutron interferometry experiments. A rational theory of measurement and a correct understanding of the EPR problem are necessary to realize quantum teleportation.

It is, therefore, an object of the present invention to provide a new method and apparatus that can realize quantum communication free from any eavesdropping using teleportation without resorting to the von Neumann projection postulate.

SUMMARY OF THE INVENTION

In accordance with the present invention, this object can be attained by a new method for a quantum communication adapted for use in transmitting a quantum state or qubit from a sender to a receiver, comprising the steps of preparing a first particle having a quantum state corresponding to encoded information to be sent, and mutually correlated second and third particles having a quantum-mechanical entanglement, the first and second particles being held by the sender, while the third particle by the receiver; generating a mixture with a predetermined mixing ratio consisting of products of a quantum state derived from the first particle and of its orthogonal state by a quantum state derived from a composite system of the second and third particles, the mixture being shared by the sender and receiver; transmitting outcomes of measurement made by the sender for a composite system of the first and second particles to the receiver via classical communication; and measuring the third particle on the receiver's side to decode the transmitted information encoded on the first particle whose quantum state is recovered on the third particle based on the measurement outcomes transmitted by the sender.

The above-mentioned object can also be preferably attained by a method for a quantum communication adapted for use in transmitting a quantum state or qubit from a sender to a receiver, comprising the steps of generating photons successively; generating from the successively generated photons a first photon with its polarization modified according to encoded information to be sent; generating from the successively generated photons second and third photons having polarization quantum-mechanically correlated; measuring the polarization of the coincidentally appearing first and second photons successively on the sender's side to transmit measurement outcomes therefrom to the receiver via classical communication; and successively measuring on the receiver's side the polarization of the third photon appearing in quantum-mechanically correlated relationship with the second photon, the polarization of the first photon being recovered on the third photon based on the measurement outcomes transmitted by the sender.

The above object can also be attained by a new apparatus for a quantum communication adapted for use in transmitting a quantum state or qubit from a sender to receiver, comprising a light source for generating photons successively; means for successively producing from the photons a first photon with its polarization modified according to encoded information to be sent to produce a qubit having a superposition of horizontally and vertically polarized states with predetermined coefficients; means for successively producing from the photons second and third photons having horizontally or vertically polarized states which are mutually quantum-mechanically correlated; means for successively measuring on the sender's side the polarized states of the coincidentally appearing first and second photons; means for transmitting outcomes of measurement from the sender to receiver via classical communication; and means for measuring on the receiver's side the polarized state of the third photon appearing in quantum-mechanically correlated relationship with the second photon, the superposition of the horizontally and vertically polarized states of the first photon being recovered on the third photon based on the measurement outcomes transmitted by the sender.

In the present invention, the well-known components of spin are measured by following the law of conservation of spin angular momentum to realize quantum teleportation through a mixture as an ancilla. This allows the receiver to recover the sender's chosen qubit on his own particle by teleportation. For practical quantum teleportation, photons we are preferably used instead of spin. In this case, the sender performs coincidence counting on the polarized states of the first and second photons successively and sends its results to the receiver via a classical message. The receiver takes the correlations between the measurement outcomes of the polarized states on the third photon and the transmitted classical message to decode the information encoded in the qubit of the first photon. The arrangement according to the present invention thus guarantees the realization of the quantum communication with near-perfect security.

BRIEF DESCRIPTION OF THE DRAWINGS

The objects and features of the present invention will become more apparent from a consideration of the following detailed description taken in conjunction with the accompanying drawings in which.

DETAILED DESCRIPTION OF THE PREFERRED EMBODIMENTS

Principle

It is indispensable to correctly understand measurement processes of physical quantities in order to grasp a quantum communication using teleportation. Although much confusion has occurred for solutions of the theory of measurement which starts from the famous work by von Neumann, S.Machida and M.Namiki (Progress of Theoretical Physics, vol.63 (1980),1457;1833) have proposed an elaborate theory with respect to the wave function collapse. In their theory of measurement, which does not rely upon the von Neumann projection postulate, they used statistical operators to describe quantum states and introduced the state of an apparatus system to show that the resolution of difficulties concerning the wave function collapse does not exist in a demonstration of the disappearance of other branch waves, but should be derived from the concept of decoherence.

In the EPR problem, two subsystems and a measuring apparatus constitute a composite system. In a quantum teleportation scheme of the type proposed by Bennett et al., an unknown state, the EPR pair and the measuring apparatus construct a composite system. The quantum mechanical state of a composite system and its subsystem cannot be specified without statistical operators. Therefore, the statistical operators are used to describe quantum states. This relies upon an important role of the conservation law in identifying the partners of measurement outcomes in one subsystem and allows the formal inconsistency of the EPR problem to be removed within the framework of present-day quantum mechanics. Such reasonable answers to avoid the EPR paradox were given by Machida. In the Bennett scheme, the transmitted states, which are the partners of measurement outcomes in the subsystem of Alice, are determined by the projection postulate. Therefore, there is no discussion with regard to the law of conservation of physical quantities subjected to the measurements. Their physical quantities subjected to Alice's measurement also contain no well-known components of spin.

In the present invention, well-known components of spin are measured and the law of conservation of spin angular momentum is used to realize the quantum teleportation. According to the Machida-Namiki theory of measurement, quantum mechanical states must be described by statistical operators as will be described in the following. This will help one well understand the quantum communication according to the present invention.

Classical Boolean states 0 and 1 can be represented by qubits $$|\phi_0\rangle = a_0|\uparrow\rangle + b_0|\downarrow\rangle$$
$$|\phi_1\rangle = a_1|\uparrow\rangle + b_1|\downarrow\rangle \quad (1)$$

These show a superposition of spin up and down states $|\uparrow\rangle$ and $|\downarrow\rangle$ like electrons. The state vector $|\phi_i\rangle$ (i=0,1), which is represented by Dirac's ket, is an Alice's chosen qubit for transmission. Complex variables $a_i$ and $b_i$ satisfy the relation $$|a_i|^2 + |b_i|^2 = 1 \quad (2)$$

for normalization. If the z-component of spin is measured in these states, the state $|\uparrow\rangle$ or $|\downarrow\rangle$ with probabilities $|a_i|^2$ or $|b_i|^2$ can be obtained, respectively. As the result of these measurements, original states $|\phi_i\rangle$ are destroyed, whose change is known as the wave function collapse. Two particles as an ancilla, which are called an EPR pair and have perfect correlation, are represented by a system consisting of two spin ½ particles prepared in an EPR singlet state, $$|\Psi^{(-)}\rangle_{12} = 1/\sqrt{2}(|\uparrow\rangle_1|\downarrow\rangle_2 - |\downarrow\rangle_1|\uparrow\rangle_2) \quad (3)$$

which is called an entangled state. In this entire composite system, the measurement of the z-component of spin in one subsystem (1 or 2) causes the wave function collapse to occur in the other subsystem. If, therefore, one follows von Neumann projection postulate, the EPR paradox stems from this description of the quantum state by the state vector as the results of measurement in one subsystem, and one encounters a "spooky" action-at-a-distance. This effect may be called a non-local long range correlation. However, since the measurement yields a change of the pure state into a mixture of spin states, this change cannot be described without the statistical operators. The statistical operator for this entire pure state is given by $$\hat{\rho}_{12} = |\Psi^{(-)}\rangle_{12}\langle\Psi^{(-)}| \qquad (4)$$

Assuming a complete measurement, the state of the entire system is converted after measurement of $S_z^{(1)}$ into $$\hat{\rho} \to \hat{\rho}_{12,\infty} = \tfrac{1}{2}(|\uparrow\rangle_1\langle\uparrow| \otimes |\downarrow\rangle_2\langle\downarrow| + |\downarrow\rangle_1\langle\downarrow| \otimes |\uparrow\rangle_2\langle\uparrow|) \qquad (5)$$

In equation (5), the symbol $\infty$ represents the state after measurement in one subsystem. This change of the statistical operator represents a disentanglement, and indicates a process which occurs as a result of the decoherence produced by the interaction of subsystem 1 with the detector of $S_z^{(1)}$. After measurement of $S_z^{(1)}$, the states of subsystems become $$\hat{\rho}_1 \to \hat{\rho}_{1,\infty} = \mathrm{Tr}^{(2)}(\hat{\rho}_{12,\infty}) = \hat{\rho}_1$$

$$\hat{\rho}_2 \to \hat{\rho}_{2,\infty} = \mathrm{Tr}^{(1)}(\hat{\rho}_{12,\infty}) = \hat{\rho}_2 \qquad (6)$$

where $$\mathrm{Tr}^{(\cdot)} \qquad (7)$$

means the partial tracing. In equation (6), it is shown that the state of one subsystem does not change before and after measurement in another subsystem, if the quantum mechanical state is described by the statistical operator. This also shows the removal of the EPR paradox.

The explanation will be made in the following for a quantum communication using teleportation of any qubit through a mixture constructed from a triplet state of two spin ½ particles as an ancilla.

Figure 1:
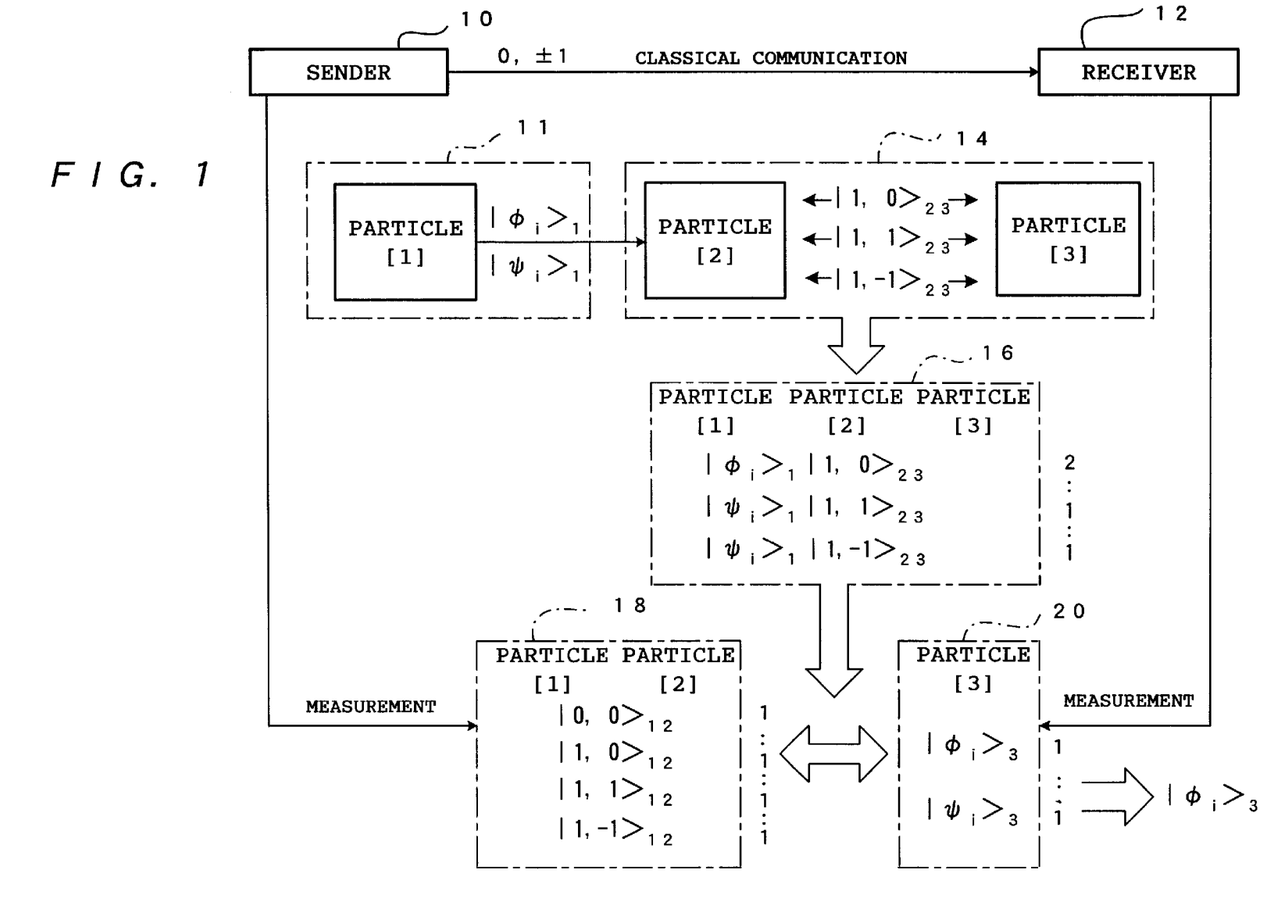
FIG. 1 is a diagram showing the basic flow chart of a quantum commmunication according to the present invention.

FIG. 1 shows a basic flow chart of the quantum communication. Referring to FIG. 1, a sender 10 prepares a block 11 of a particle [1], which consists of a predetermined qubit $|\phi\rangle_1 (|\phi_0\rangle_1$ is not orthogonal to $|\phi_1\rangle_1)$ and of its orthogonal state $|\psi\rangle_1$. The sender and the receiver prepare two entangled particles [2] and [3] as an ancilla, and the particle [2] is maintained in the sender 10, while the other particle [3] in a receiver 12. In a composite system 14, the sender and the receiver prepare to share three states of triplet $|1,0\rangle_{23}$, $|1,1\rangle_{23}$, and $|1,-1\rangle_{23}$ each having the z-component 0, 1 and $-1$, respectively. The sender 10 produces pure product states $|\phi\rangle_1|1,0\rangle_{23}, |\psi\rangle_1|1,1\rangle_{23}$, and $|\psi\rangle_1|1,-1\rangle_{23}$, respectively, and joins these products into a mixture 16 with an intensity ratio 2:1:1. Rewriting $|1,0\rangle=|\Psi^{+}\rangle, |1,1\rangle=|1\rangle$ and $|1,-1\rangle=|-1\rangle$, the mixture is given by $$\hat{\rho}_{1,23} = \tfrac{1}{4}\{|\psi\rangle_1\langle\psi| \otimes |1\rangle_{23}\langle 1| + |\psi\rangle_1\langle\psi| \otimes |-1\rangle_{23}\langle -1| + 2|\phi\rangle_1\langle\phi| \otimes |\Psi^{(+)}\rangle_{23}\langle\Psi^{(+)}|\} \qquad (8)$$

where $$|\phi\rangle = a|\uparrow\rangle + b|\downarrow\rangle$$
$$|\psi\rangle = -b^*|\uparrow\rangle + a^*|\downarrow\rangle$$
$$|\Psi^{(+)}\rangle = 1/\sqrt{2}(|\uparrow\rangle|\downarrow\rangle + |\downarrow\rangle|\uparrow\rangle) \qquad (9)$$

Partial tracing yields that $$\hat{\rho}_1 = \mathrm{Tr}^{(23)}(\hat{\rho}_{1,23}) = \tfrac{1}{2}\{|\psi\rangle_1\langle\psi| + |\phi\rangle_1\langle\phi|\}$$

$$\hat{\rho}_{23} = \mathrm{Tr}^{(1)}(\hat{\rho}_{1,23}) = \tfrac{1}{4}\{|1\rangle_{23}\langle 1| + |-1\rangle_{23}\langle -1| + 2|\Psi^{(+)}\rangle_{23}\langle\Psi^{(+)}|\} \qquad (10)$$

which correspond to the blocks 11 and 14, respectively. Recomposition of the sub-systems 1,23 with 12,3 gives $\hat{\rho}_{12,3}$, from which $$\hat{\rho}_3 = \mathrm{Tr}^{(12)}(\hat{\rho}_{12,3}) = \tfrac{1}{2}\{|\psi\rangle_3\langle\psi| + |\phi\rangle_3\langle\phi|\}$$

$$\hat{\rho}_{12} = \mathrm{Tr}^{(3)}(\hat{\rho}_{12,3}) = \tfrac{1}{4}\{|1\rangle_{12}\langle 1| + |-1\rangle_{12}\langle -1| + |\Psi^{(+)}\rangle_{12}\langle\Psi^{(+)}| + |\Psi^{(-)}\rangle_{12}\langle\Psi^{(-)}|\} \qquad (11)$$

are obtained, which correspond to blocks 20 and 18, respectively. The sender 10 then makes a joint measurement of the z-component of spin of the composite system 18 on her own particles [1] and [2]. After measurement of $S_z^{(12)} \hat{\rho}_{12,3}$ is converted into $$\hat{\rho}_{12,3} \to \hat{\rho}_{12,3,\infty} = \tfrac{1}{4}[\{|1\rangle_{12}\langle 1| + |-1\rangle_{12}\langle -1|\} \otimes$$
$$\{|b|^2|\uparrow\rangle_3\langle\uparrow| + |a|^2|\downarrow\rangle_3\langle\downarrow|\} + \tfrac{1}{2}|\Psi^{(+)}\rangle_{12}\langle\Psi^{(+)}| \otimes$$
$$\{2|a|^2|\uparrow\rangle_3\langle\uparrow| + 2|b|^2|\downarrow\rangle_3\langle\downarrow| + ab^*|\uparrow\rangle_3\langle\downarrow| + a^*b|\downarrow\rangle_3\langle\uparrow|\} + \tfrac{1}{2}|\Psi^{(-)}\rangle_{12}\langle\Psi^{(-)}| \otimes$$
$$\{2|a|^2|\uparrow\rangle_3\langle\uparrow| + 2|b|^2|\downarrow\rangle_3\langle\downarrow| - ab^*|\uparrow\rangle_3\langle\downarrow| - a^*b|\downarrow\rangle_3\langle\uparrow|\}] \qquad (12)$$

Finally, $$\hat{\rho}_{3,\infty} = \mathrm{Tr}^{(12)}(\hat{\rho}_{12,3,\infty}) = \hat{\rho}_3$$

$$\hat{\rho}_{12,\infty} = \mathrm{Tr}^{(3)}(\hat{\rho}_{12,3,\infty}) = \hat{\rho}_{12} \qquad (13)$$

are obtained.

The sender, Alice, 10 obtains measurement outcomes 0 or ±1 from measurement on the composite subsystem consisting of the particles [1] and [2], and sends to the receiver, Bob, 12 the classical results of her measurement via classical message line. The receiver 12 receives its message and can know that the state $|\phi\rangle_3$ or $|\psi\rangle_3$ is recovered on a block of his own particle [3] based on the law of conservation of spin angular momentum. He can then know that $|\phi_0\rangle_1$ or $|\phi_1\rangle_1$ is transmitted by decoding information derived from the measurement on the particle [3]. The way of encoding and decoding of classical Boolean states 0 and 1 and the direction of a z-axis may be determined between the sender and the receiver. The receiver can also determine 0 or 1 from the difference in probabilities of his measurement. In contrast to the teleportation scheme of Bennett, the method according to the invention necessitates no manipulation to convert the state of Bob's EPR particle into an exact replica of the unknown state which Alice destroyed.

The preferred embodiments of the invention will now be described in detail with reference to FIGS. 2 to 6.

First Embodiment using Photons

Theoretically, any spin ½ particle such as an electron or neutron etc. can be used for the quantum communication of a qubit. Actually, however, its realization by means of these particles would be difficult and the polarization of a photon seems the only possible candidate. For this reason, a new method and apparatus have been proposed using three photons to realize a quantum communication according to the present invention.

If the polarizations of a photon are used as a substitute of the components of spin, $$|\leftrightarrow\rangle = x, \quad |\updownarrow\rangle = y \qquad (14)$$

is given, where x and y are the horizontal and vertical linearly polarized states of a photon, respectively. Rewriting $|\uparrow\rangle = x$ and $|\downarrow\rangle = y$ or vice versa, all the aforementioned principles for spin are valid for photons. Experiments, however, show that the polarization of a composite system of the particles [1] and [2] cannot be measured as a whole, if the polarizations of a photon are used as a substitute for the components of spin because the polarization can be measured only for each photon. Moreover, the arrangement using photons makes it impossible to directly construct the state of three photons in the block 16 in FIG. 1 corresponding to equation (8), and also to generate the state of three photons in the blocks 18 and 20, from which equation (11) is derived. Because of these practical constraints, special means are necessary to realize the quantum communication by three photons.

Figure 2:
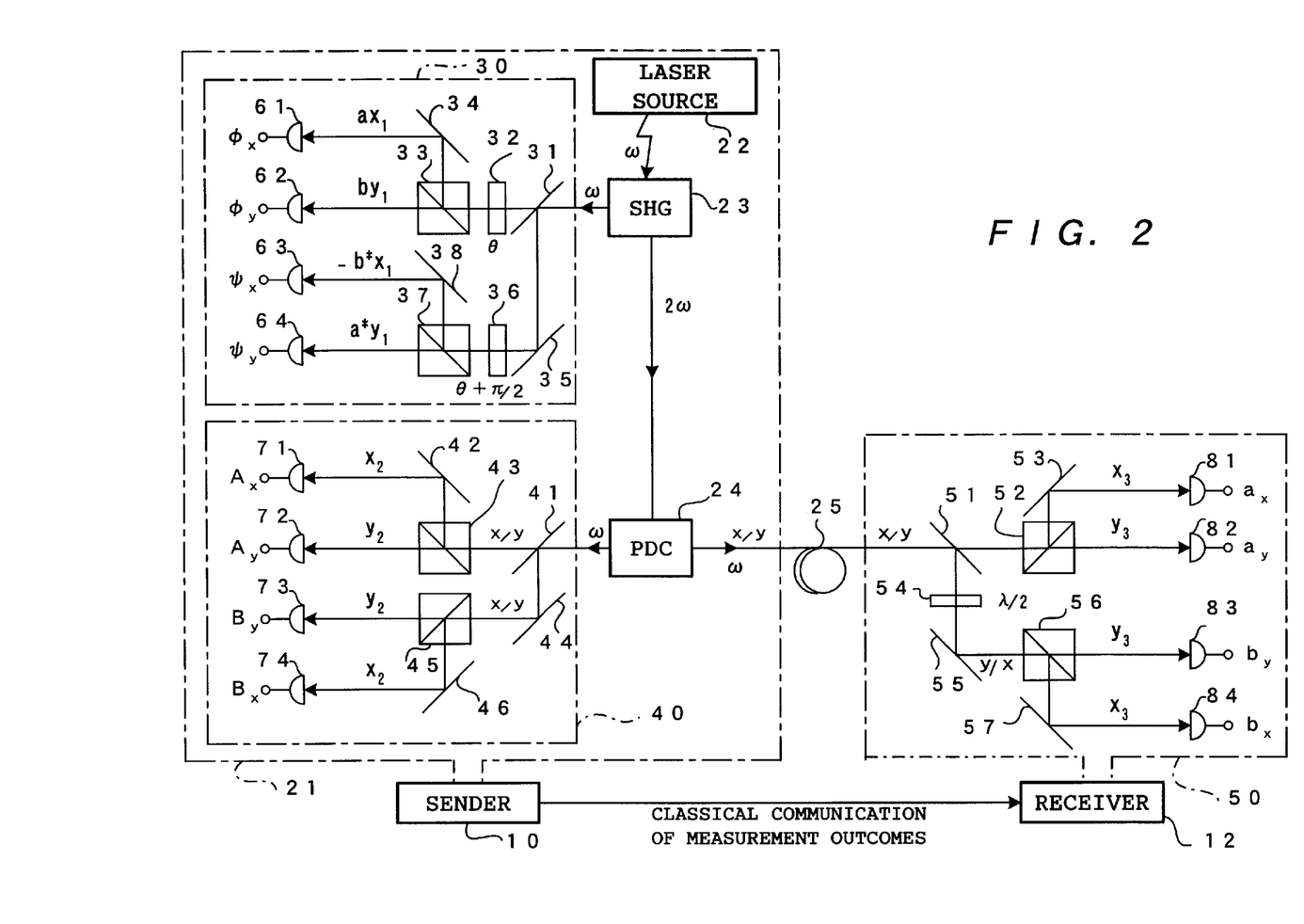
FIG. 2 is a block diagram illustrating an arrangement of optical elements used for a quantum communication apparatus using the polarization of photons.

An embodiment in FIG. 2 makes possible the quantum communication using three photons. In FIG. 2, the sender 10 and the receiver 12 prepare blocks 21 and 50, respectively. A light source 22 in the block 21 successively generates laser pulses with angular frequency ω at intervals of the order of nanoseconds. Each pulse impinges on a secondary harmonics generator 23 (SHG; for example, $KNbO_3$ crystal). Although the laser source generating intermittent pulses is used in this embodiment, a laser source which can generate a continuous laser beam may also be used.

A photon [1] transmitted through the SHG 23 is introduced into a block 30. A photon with angular frequency 2ω generated by the SHG 23 again impinges on a type I parametric down converter 24 (PDC; for example, non-linear crystal $KNbO_3$). The PDC 24 produces two photons with angular frequency ω with one photon introduced into a sender's block 40 as beams of a photon [2] and the other into the receiver's block 50 as beams of a photon [3] via optical fiber 25. The type I PDC simultaneously produces two x or y-polarized photons into two different arms.

The photon [1] introduced from the SHG 23 into the block 30 is divided into two beams by a beam-splitter (BS) 31. One beam transmitted through the BS 31 forms the state $|\phi\rangle_1$ after passing through a Faraday rotator (crystal) 32 with rotation angle θ. The photon with its direction of polarization rotated by θ is again divided into two beams by a polarizing beam-splitter (PBS) 33 with one beam in an arm $ax_1$, and the other in an arm $by_1$ each respectively having the rotation angle θ. In the PBS 33, the x-polarized photon is reflected and the y-polarized one transmitted therethrough. The beam $by_1$ is directly introduced into a detector 62. The beam $ax_1$, is introduced into a detector 61 after reflection by a mirror 34.

The other beam reflected by the BS 31 forms the state $|\psi\rangle_1$ after reflection by a mirror 35 and passes through a Faraday rotator 36 with rotation angle θ+π/2. This photon is divided into two beams by a PBS 37 with one beam in an arm $a^*y_1$ and the other in an arm $-b^*x_1$ each respectively having the rotation angle θ+π/2. The beam $a^*y_1$ is directly introduced into a detector 64. The beam $-b^*x_1$ is introduced into a detector 63 after reflection by a mirror 38.

The block 30 of the photon [1] corresponds to the block 11 in FIG. 1, thus forming qubits consisting of $|\phi\rangle_1$ and $|\psi\rangle_1$ on the photon [1]. The qubits corresponding to the classical bits 0 and 1 are thus produced by the Faraday rotators 32 and 36 with the different rotation angles of θ.

The photon [2] introduced from the PDC 24 into the block 40 is divided into two beams by a BS 41 with their polarized states maintained. One beam transmitted through the BS 41 is again divided into two arms of $x_2$ and $y_2$ by a PBS 43. The beam $y_2$ is directly introduced into a detector 72. The beam $x_2$ is introduced into a detector 71 after reflection by a mirror 42. The other beam reflected by the BS 41 is divided into two arms of $x_2$ and $y_2$ by a PBS 45 after reflection by a mirror 44. The beam $y_2$ is directly introduced into a detector 73. The beam $x_2$ is introduced into a detector 74 after reflection by a mirror 46.

The photon [3] transmitted from the PDC 24 to the block 50 of the receiver via optical fiber 25 is divided into two beams by a BS 51. One beam transmitted through the BS 51 is again divided into two arms of $x_3$ and $y_3$ by a PBS 52. The beam $y_3$ is directly introduced into a detector 82. The beam $x_3$ is introduced into a detector 81 after reflection by a mirror 53. The other beam reflected by the BS 51 is caused to pass through a half wave plate 54 for conversion from the y-and x-polarized into x-and y-polarized photons. The thus converted beam is divided into two arms of $x_3$ and $y_3$ by a PBS 56 after reflection by a mirror 55. The beam $y_3$ is directly introduced into a detector 83. The beam $x_3$ is introduced into a detector 84 after reflection by a mirror 57.

Figure 3:
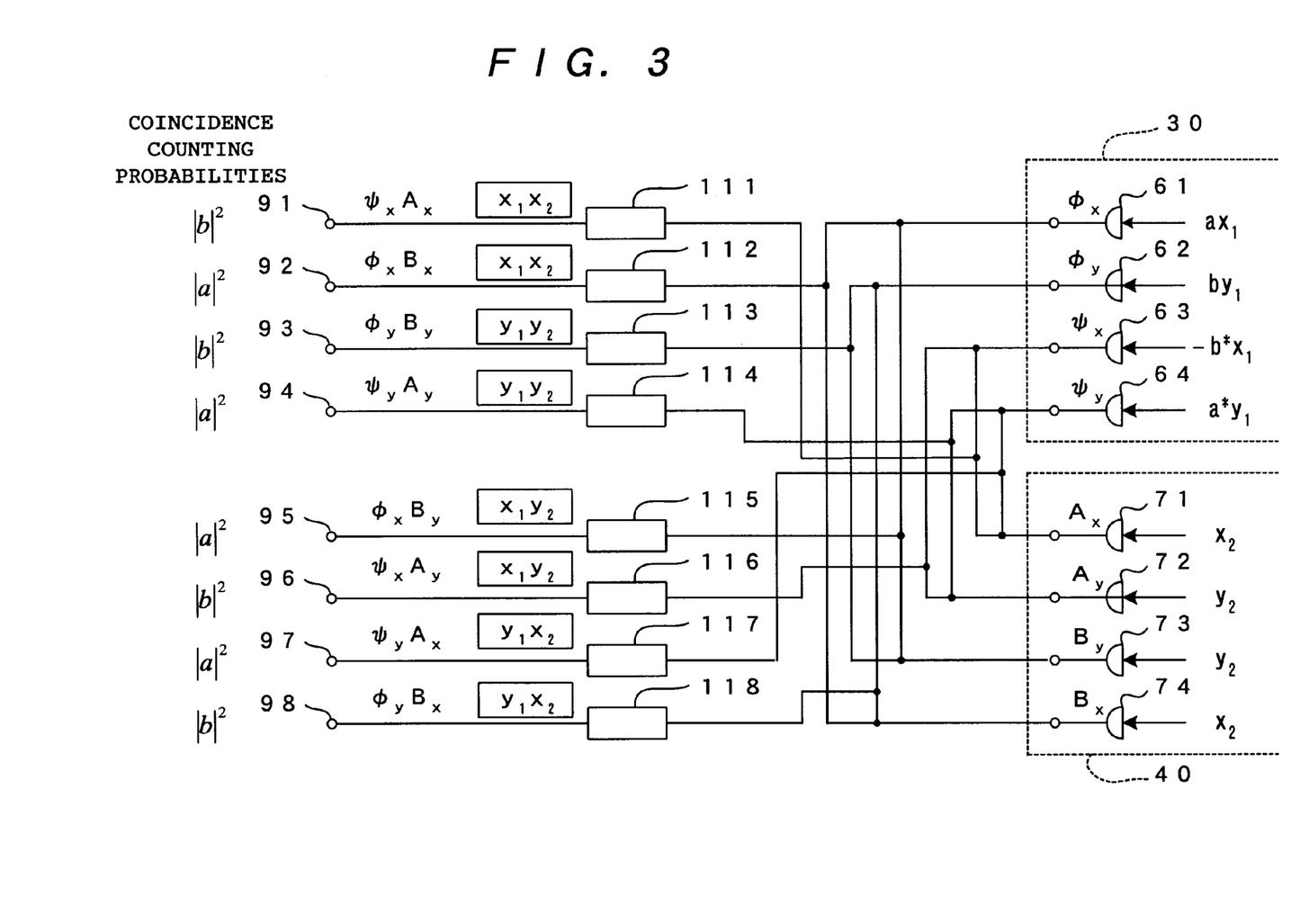
FIG. 3 is a diagram showing coincidence counting of the polarized states at eight terminals of the sender's block FIG. 2.

In the apparatus according to the present invention, only one photon appears in one of the detectors 61 to 64 of the block 30, one of the detectors 71 to 74 of the block 40 and one of the detectors 81 to 84 of the block 50, respectively, for each pulse generated by the laser source 22. The sender on the subsystem of the photons [1] and [2] measures the coincidence of appearance of photons [1] and [2] and performs a coincidence counting, in which the coincidence of the photons [1] and [2] appearing at each pair of terminals is counted using counters 111 to 118 as shown in FIG. 3.

The counters 111 to 114 successively count the coincidence of two photons from a pair of the terminals connected to the detectors 63,71; 61,74; 62,73 and 64,72, and produces coincidence counting probabilities $|b|^2$, $|a|^2$, $|b|^2$, and $|a|^2$ corresponding to the coefficients a and b at their outputs 91 to 94.

Similarly, the counters 115 to 118 successively count the coincidence of two photons from a pair of the terminals connected to the detectors 61,73; 63,72; 64,71 and 62,74, and produces coincidence counting probabilities $|a|^2$, $|b|^2$, $|a|^2$, and $|b|^2$ corresponding to the coefficients a and b at their outputs 95 to 98.

Figure 4:
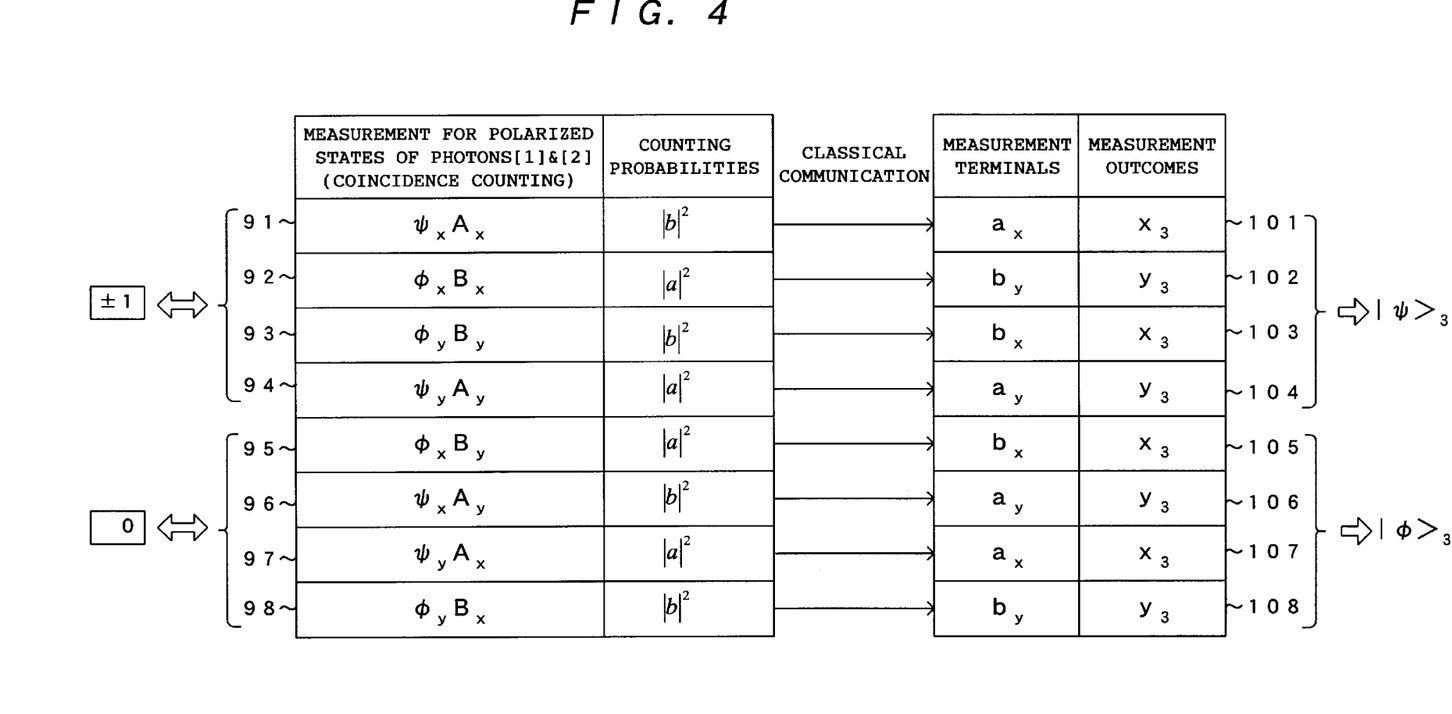
FIG. 4 is a diagram showing the transmission of measurement outcomes to a receiver via classical message line and a correlation between measurements on the sender and receiver sides.

The sender transmits the results of the coincidence counting at the output terminals 91 to 98 for each pulse together with its counting order to the receiver via a classical message. The receiver, on the other hand, counts and records the appearance of the photon [3] and its appearance order at each terminals connected to the detectors 81 to 84 of different arms of polarizations. Based on this classical message, the receiver can determine terminals 101 to 108 for his measurement and, as shown in FIG. 4, take correlation between the classical message and his measurement, i.e., between measurement outcomes 91 and 101; 92 and 102; , , , 98 and 108. The events in which the coincidence occurs on the three photons are collected and counted. This provides the results 101 to 108 with the corresponding probabilities as shown in FIG. 4. The receiver can get $x_3$ with the probability $|b|^2$ and $y_3$ with the probability $|a|^2$ at the terminals 101 to 104, and he thus can determine therefrom that the transmitted qubit is $|\psi\rangle_3$. The receiver, on the other hand, gets y3 with the probability $|b|^2$ and $x_3$ with the probability $|a|^2$ at the terminals 105 to 108, and he can determine therefrom that the transmitted qubit is $|\phi\rangle_3$.

Now assuming, for example, that one classical bit 0 is transmitted to the receiver, the sender operates the laser source 22 to generate pulses successively at intervals of the order of nanoseconds and sets the variable θto a predetermined value using the Faraday rotators 32 and 36. For the photon [1] the sender thus gets the quantum superposed states $|\phi\rangle_1$ and its orthogonal state $|\psi_0\rangle_1$ corresponding to the classical bit 0 from the arms of $ax_1$ and $by_1$ or $-b^*x_1$ and $a^*y_1$. The sender produces the photons [2] and [3] having predetermined polarizations of x or y from the PDC 24, and sends the photon [3] to the receiver 12 via optical fiber 25.

The sender 10 counts the coincidence using the counters 111 to 118 for each of 100 to 1000 pulses generated by the laser source 22. Since the phenomenon occurring according to the quantum mechanics is probabilistic, the results of measurement can be obtained as a probability of the coincidence countings corresponding to the coefficients a and b that represents the classical bit 0. The sender 10 sends to the receiver the measurement outcomes and its order at the terminals 91 to 98 via a classical message.

The terminals $a_x$, $a_y$, $b_x$, and $b_y$ of the receiver 12, who measures the photon [3], are correlated with the measuring terminals of the photon [2] $A_x$, $A_y$, $B_y$ and $B_x$ of the sender 10, respectively. The horizontally or vertically polarized photon appears at the terminals 101 to 108. The receiver 12 counts and records the appearance of photons at the terminals associated with the detectors 81 to 84 together with its appearance order. The receiver then checks the appearance of photons at the terminals determined based on the coincidence counting on the sender's side, and takes the correlation between the measurement outcomes 91 and 101, 92 and 102, ,, 98 and 108. This allows the receiver 12 to derive or recover the qubit $|\psi_0\rangle_3$ corresponding to the superposition of $x_3$ and $y_3$ with coefficients $-b^*$ and $a^*$ from the terminals 101 and 103 on which the horizontal polarization $x_3$ appears and the terminals 102 and 104 on which the vertical polarization $y_3$ appears. He can thus know the recovery of $|\psi_0\rangle_1$ on the photon [3]. Similarly, the receiver can derive $|\phi_0\rangle_3$ from the terminals 105 to 108 and know the recovery of $|\phi_0\rangle_1$ on the photon [3].

If the sender 10 wants to transmit classical bit 1, she may rotate θ by an arbitrary value (but, not equal to 0 or π). This rotation causes a change in coefficients a and b and counting probabilities. The receiver can derive $|\psi_1\rangle_3$ and $|\phi_1\rangle_3$ corresponding to bit 1, and know the recovery of $|\psi_1\rangle_1$ and $|\phi_1\rangle_1$ on the photon [3].

From the above-mentioned description it will be understood that both the results of the coincidence counting for each pulse via a classical message and the polarized state of the photon [3] (correlated with the polarized states of the photon [2] are needed to recover the encoded information in qubit of the photon [1] on the receiver's side. The eavesdropper can not recover the encoded information in qubit on the photon [1] from only the information on the coincidence counting for each pulse in the classical message line or from measurement of the polarized states of the photon [3] in the optical fiber.

The quantum transmission channel 25 passes the polarized photons carrying no information, thus making eavesdropping at the channel 25 impossible. That is, the quantum channel 25 functions only to transmit the polarized photons and the classical channel serves to transmit information necessary to determine the terminals for measurement on the receiver's side. This means that data from the quantum and classical channels are needed for 100 to 1000 pulses to recover bit 0 or 1. If pulses reduce in number, for example, to a half because of the eavesdropping at the quantum channel 25, both of the receiver and the eavesdropper cannot recover the information from the sender. In this sense, the communication can be destroyed. However, the predetermination of coefficients a and b for bit 0 or 1 between the sender and the receiver allows the receiver to recover the information of the sender and the eavesdropping to be prevented.

In the teleportation process using photons, the measurement and the classical message are more complicated than those in FIG. 1. This is because the use of photons causes the practical constraints as mentioned at the end of paragraph "principle". It is to be noted that the measurement on the receiver's side may be recorded automatically for later reading in response to the classical message from the sender.

The results of measurement at the terminals 91 to 94 and at the terminals 95 to 98 correspond to the ±1 and 0 for measurement of spin, respectively. In this respect, the incorporation of AND and OR gates to the measurement terminals of the detectors 61 to 64 and 71 to 74 may simplify the measurement of the sender and his classical message. Although the measurement at the terminals 101 to 108 of the receiver can be simplified by presetting the variable θ of the Faraday rotators 32 and 36, it can also be simplified by replacement of the above-mentioned measurement into measurement of $|\phi\rangle_3$ and $|\psi\rangle_3$.

In FIG. 2, the block 30 of the photon [1] and the block 40 and 50 correspond to the first and second equations (10), respectively. The block 21 and the block 50 after measurement at the terminals 91 to 98 correspond to the second and first equations (11). Similarly, the block 21 and the block 50 after measurement at the terminals 91 to 98 correspond to the equation (12). However, as mentioned at the end of paragraph "principle", these correspondences do not mean that the arrangement of the blocks is equivalent to equations (10), (11) and (12), but they bring about the same results of coincidence counting in terms of a quantum communication.

In FIG. 2, other elements such as filters or dummy mirrors may be used to adjust the intensity of light in the blocks 30, 40 and 50 or to adjust the path of light for simultaneous arrival of photons within the response time of the detectors 61 to 64, 71 to 74 and 81 to 84, but they are omitted in the drawings for purposes of simplicity. The adjustment of the temperature of the PDC crystal is also omitted for simplicity. Polarizers for refining the measurement or communication are also omitted. It will, however, be understood that the omitted optical elements can be easily provided, if necessary.

It may be possible to replace some of the optical elements or add a few optical elements in FIG. 2 without changing the substantial arrangement. For example, a type II PDC may be used in replacement by the type I PDC 24, or a half wave plate with λ/2 may be used. The Faraday rotator with the rotation angle e can also be replaced by a half mirror with an arbitrary coefficient of reflection.

Second Embodiment using Photons

Figure 5:
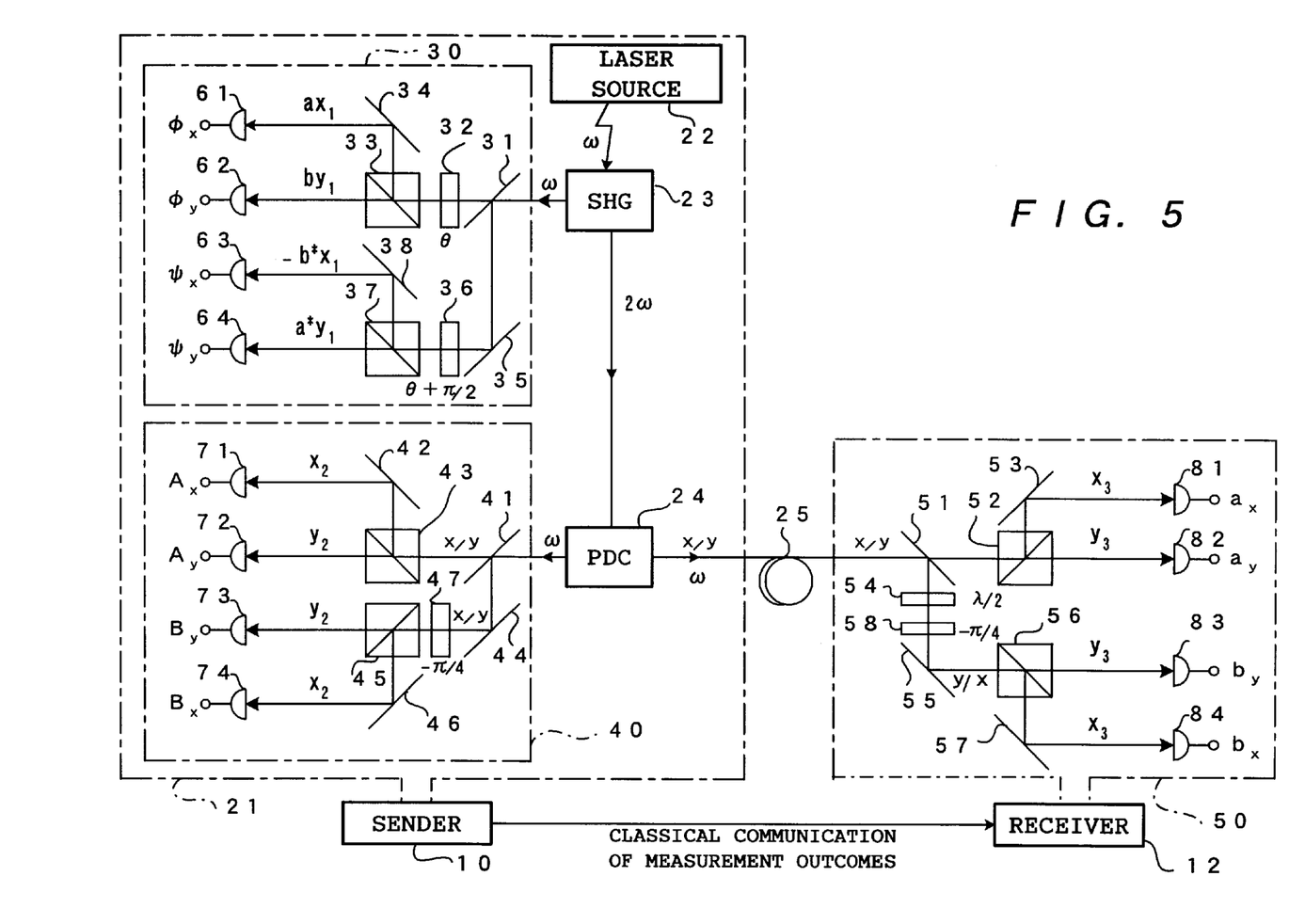
FIG. 5 is another diagram illustrating an arrangement of optical elements used for a quantum communication apparatus using the polarization of photons.

In the first embodiment, the probabilities of coincidence counting are redundant and only the encoded bit 0 or 1 can be recovered in terms of the absolute values of coefficients a and b. FIG. 5 shows an improved embodiment in which the drawbacks can be overcome and the encoded information can be recovered also in terms of phase differences between the coefficients a and b.

In FIG. 5, the same optical elements as those in FIG. 2 are indicated by the same reference numerals and their detailed explanation is omitted. In FIG. 5, two Faraday rotators 47 and 58 with the rotation angle of −π/4 with respect to x-axis are added between the mirror 44 and the PBS 45 in the block 40 and between the half wave plate 54 and the mirror 55 in the block 50, respectively.

In this arrangement, the same coincidence countings as shown in FIG. 3 are performed at the terminals $\psi_x$, $\psi_y$, $A_x$ and $A_y$ of the detectors 63, 64, 71 and 72, respectively. The sender sends these results of counting to the receiver via a classical message. The receiver counts the photons appearing at the terminals $a_x$ and $a_y$ of the detectors 81 and 82 and takes correlation between his measurement and the classical message, as is the same with the first embodiment in FIG. 2. This allows the receiver to recover the encoded information in terms of the absolute values of coefficients a and b.

Figure 6:
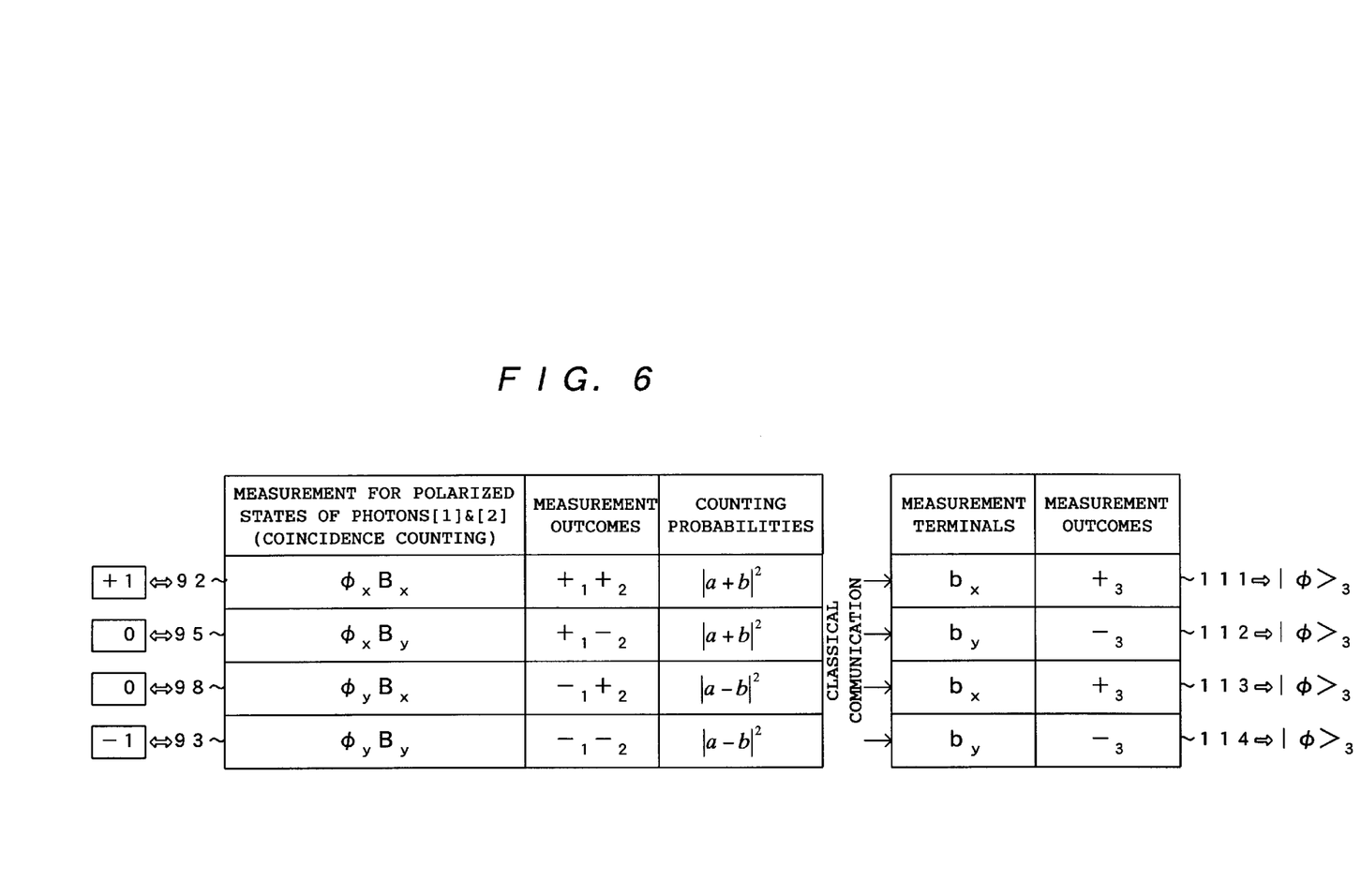
FIG. 6 is a modified diagram showing the transmission of measurement outcomes to a receiver via classical message line and a correlation between measurements on the sender and receiver sides using two added Faraday rotators.

On the other hand, the insertion of the Faraday rotators 47 and 58 changes the processes of the coincidence counting at the terminals $\phi_x$, $\phi_y$, $B_y$ and $B_x$ of the detectors 61, 62, 73 and 74, the counting at the terminals by and b, of the detectors 83 and 84, and the correlation taken between the measurement on the receiver's side and the classical message as follows: the measuring direction of polarization is rotated by $\pi/4$ (+direction) at the terminals $\phi_x$, $B_x$ and $b_x$ of the detectors 61, 74 and 84, respectively, while by $3\pi/4$ (−direction) at the terminals $\phi_y$, $B_y$ and $b_y$ of the detectors 62, 73 and 83. Coincidence countings 92,93, 95 and 98 on the photon [1] and [2] are. the same as those in FIG. 3. However, the results of measurement 102, 103, 105 and 108 on the photon [3] are changed into measurement results 111 to 114 as shown in FIG. 6, since the x- and y-polarized states mix by the exchange of terminals $b_y$ and $b_x$ of the detectors 83 and 84. This change causes the probabilities of coincidence counting to be converted into the square of |a+b| and |a−b|, and allows the receiver to recover the encoded information in terms of the phase differences between the coefficients a and b.

In this second embodiment, the redundancy of the measurement outcomes can be reduced to a half of the first embodiment. In addition, the full message involved in coefficients a and b can be recovered.

Third Embodiment using Photons The detectors of photon 61 to 64, 71 to 74 and 81 to 84 used in the first and second embodiments can measure only one photon. The detectors are made of expensive avalanche photo diodes (APD). The APDs can be reduced in number to a half of the previous embodiments. Nevertheless, the full message involved in coefficients a and b can be recovered. For this purpose, coincidence countings at the terminals $\psi_x$, $\psi_y$, $A_x$ and $A_y$ of the detectors 63, 64, 71 and 72 are omitted, and the photons arriving at the arms connected thereto are not counted. Accordingly, the measurements at the terminals $a_x$ and $a_y$ of the detectors 81 and 82 on the receiver's side are also not performed.

On the other hand, the same processes as those in the first embodiment are carried out with respect to coincidence countings at the terminals $\phi_x$, $\phi_y$, $B_x$ and $B_y$ of the detectors 61, 62, 73 and 74, transmission of these results via a classical message, the determination of the terminals $b_x$ and $b_y$ of the detectors 83 and 84, and the measurement at these terminals. This allows the receiver to recover encoded information in terms of the absolute values of coefficients a and b.

The measurements as mentioned in the second embodiment are then performed at the terminals) $\phi_x$, $\phi_y$, $B_x$, $B_y$, $b_x$ and by of the detectors 61, 62, 73, 74, 83 and 84, thus allowing the receiver to recover the encoded information in terms of phase differences between the coefficients a and b.

This makes it possible to reduce the APDs in number by a half as compared with the first and second embodiments. In addition, the full message involved in coefficients a and b can also be recovered. This also makes it possible to realize a Bennett type of communication using a pure state of particles [2] and 131 as an ancilla, though the scheme is not the same as that of the Bennett. In addition to the communication using binary digits, multi-valued communication is also possible so far as the difference of probabilities can be determined in these communications.

What is claimed is:

1. A method for quantum communication adapted for use in transmitting a quantum state or qubit from a sender to a receiver, comprising the steps of:

preparing a first particle having a quantum state corresponding to encoded information to be sent, and preparing mutually correlated second and third particles having a quantum-mechanical entanglement, the first and second particles being observed by the sender, and the third particle being observed by the receiver;

generating a mixture with a predetermined mixing ratio consisting of products of a first quantum state derived from the first particle and an orthogonal state thereof and a second quantum state derived from a composite system of the second and third particles, the mixture being shared by the sender and receiver;

transmitting outcomes of measurement made by the sender for a composite system including the first and second particles to the receiver via classical communication; and measuring the third particle on the receiver's side to decode the transmitted information encoded on the first particle whose quantum state is recovered on the third particle based on the measurement outcomes transmitted by the sender.

2. A method as set forth in claim 1; wherein the particles comprise photons, electrons or neutrons.

3. A method for quantum communication adapted for use in transmitting a quantum state or qubit from a sender to a receiver, comprising the steps of:

generating photons successively;

generating from the successively generated photons a first photon having a polarization that is modified according to encoded information to be sent;

generating from the successively generated photons second and third photons having polarizations that are quantum-mechanically correlated;

measuring the polarization of the coincidentally appearing first and second photons successively on the sender's side to transmit measurement outcomes therefrom to the receiver via classical communication; and successively measuring on the receiver's side the polarization of the third photon appearing in quantum-mechanically correlated relationship with the second photon, the polarization of the first photon being recovered on the third photon based on the measurement outcomes transmitted by the sender.

4. A method as set forth in claim 3; further comprising the step of decoding information in terms of absolute values of coefficients of x- and y-polarized states of the first photon.

5. A method as set forth in claim 3; further comprising the step of decoding information in terms of a phase difference of coefficients of x- and y-polarized states of the first photon.

6. An apparatus for quantum communication adapted for use in transmitting a quantum state or qubit from a sender to receiver, comprising:

a light source for generating photons successively;

means for successively producing from the successively generated photons a first photon having a polarization that is modified according to encoded information to be sent from a sender to a receiver to produce a qubit having a superposition of horizontally and vertically polarized states with predetermined coefficients;

means for successively producing from the successively generated photons second and third photons having horizontally or vertically polarized states which are mutually quantum-mechanically correlated;

means for successively measuring on the sender's side the polarized states of the coincidentally appearing first and second photons;

means for transmitting outcomes of measurement from the sender to the receiver via classical communication; and means for measuring on the receiver's side the polarized state of the third photon appearing in quantum-mechanically correlated relationship with the second photon, the superposition of the horizontally and vertically polarized states of the first photon being recovered on the third photon based on the measurement outcomes transmitted by the sender.

7. An apparatus as set forth in claim 6; further comprising means for counting the coincidence of the first and second photons to provide probabilities corresponding to the coefficients of the horizontally and vertically polarized states of the first photon.

8. An apparatus as set forth in claim 6; further comprising means for decoding information in terms of absolute values of coefficients of horizontally and vertically polarized states of the first photon.

9. An apparatus as set forth in claim 6; further comprising means for decoding information in terms of a phase difference of coefficients of horizontally and vertically polarized states of the first photon.

* * * * *